Oct. 14, 1969  C. A. SCAPEROTTO  3,472,401
PIPE-LIFTING ATTACHMENT FOR EXCAVATING EQUIPMENT
Filed April 5, 1968  2 Sheets-Sheet 1
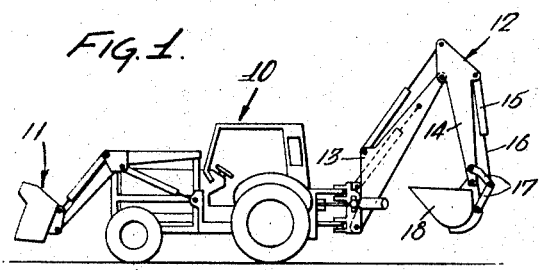
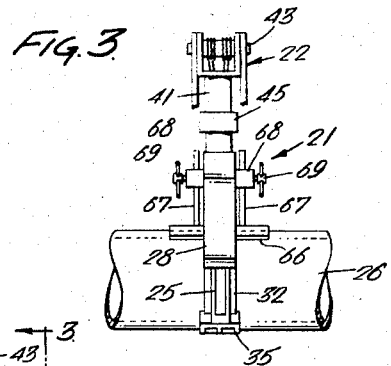
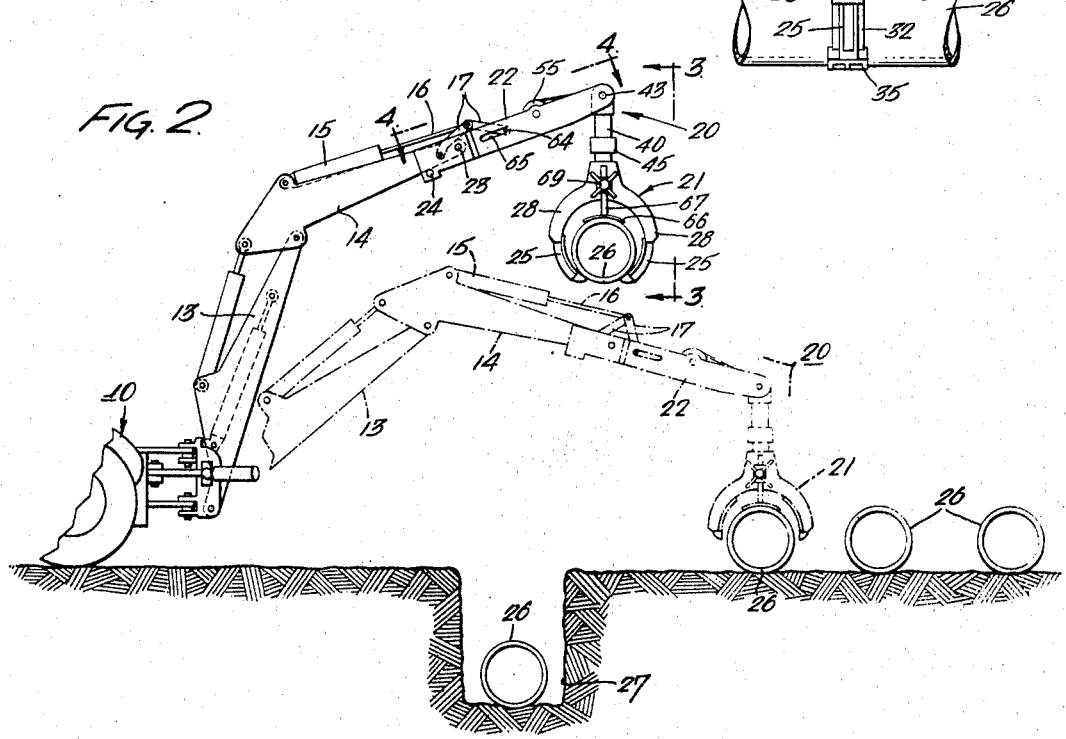
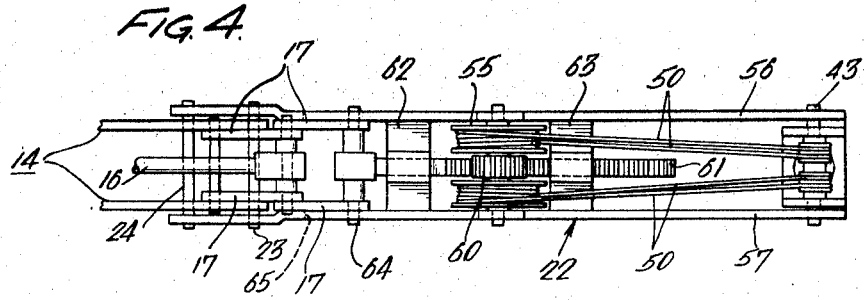
INVENTOR:
CHARLES A. SCAPEROTTO
BY Howson & Howson
ATTYS.

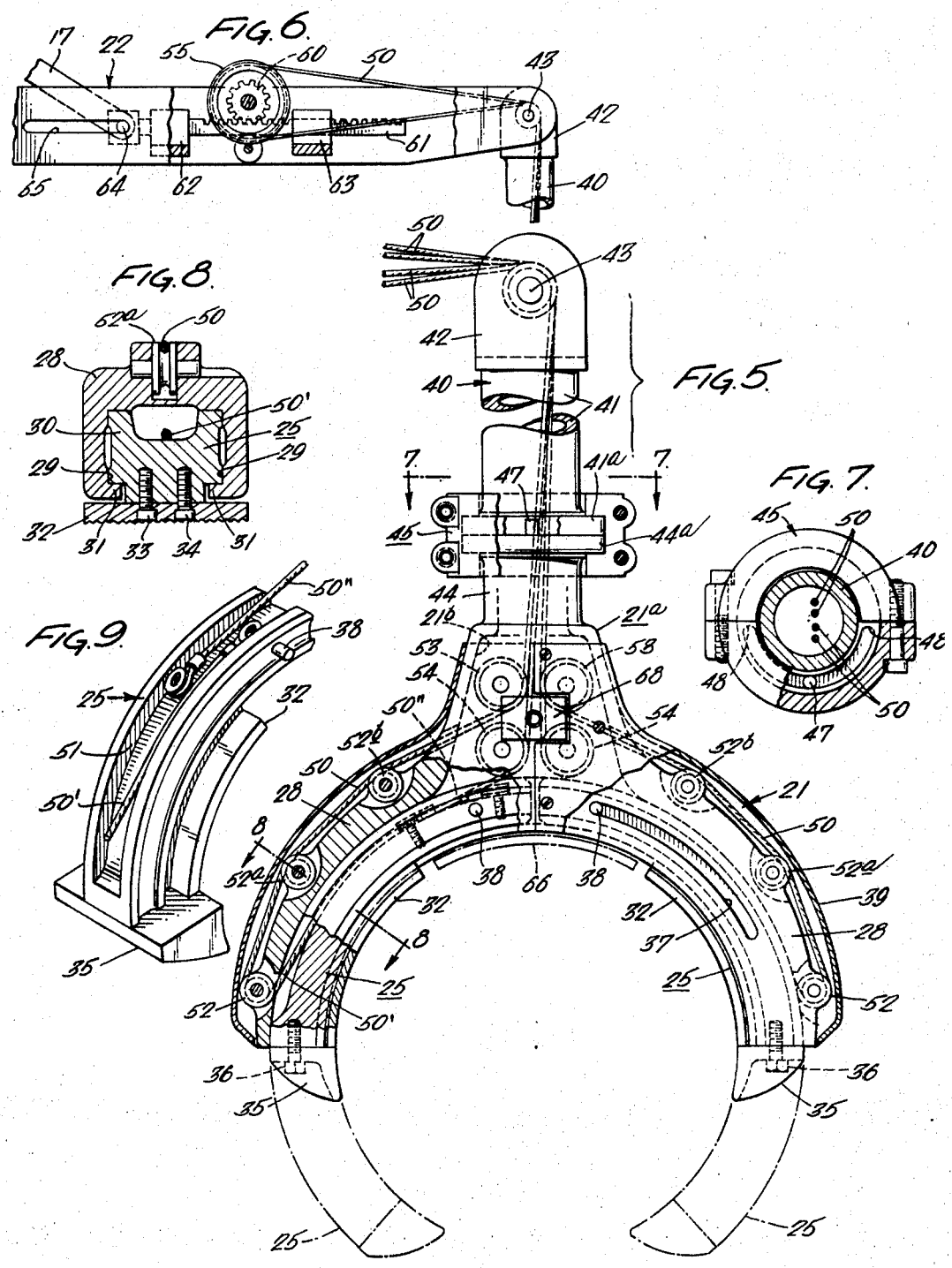

United States Patent Office 3,472,401
Patented Oct. 14, 1969

1

3,472,401
PIPE-LIFTING ATTACHMENT FOR EXCAVATING EQUIPMENT
Charles A. Scaperotto, 931 Kenmore Road, Philadelphia, Pa. 19151
Filed Apr. 5, 1968, Ser. No. 719,209
Int. Cl. B66c 3/00; B66f 9/18
U.S. Cl. 214—147                                        9 Claims

ABSTRACT OF THE DISCLOSURE

A backhoe having a boom mounting a hydraulic cylinder is provided with a pipe-lifting attachment which comprises an extension member mounted on the boom and a lifting yoke depending downwardly therefrom which has a pair of telescoping claws for supporting a pipe. The claws are selectively extended and retracted to engage a pipe by an operating mechanism which is connected to the hydraulic cylinder and which actuates the claws in response to the operation of the cylinder.

The present invention relates to pipe-handling equipment, and more particularly, the present invention relates to new and useful improvements in pipe-lifting attachments for use with existing excavating equipment.

At present, trenches or ditches in which pipe is to be laid are dug by a tractor-mounted device commonly referred to as a backhoe. When the trench is completed, the primary job of the backhoe is finished, and other equipment is then employed to lay the pipe in the trench. With conventional pipe-laying equipment, however, a sling is often employed to lift the pipe; in some cases the sling supports each end of a bar which is inserted longitudinally in the pipe. The pipe-lifting arrangement is undesirable not only because additional workmen are required to connect the sling to the pipe at a storage location and to disconnect the sling from the pipe after it has been laid within the trench, but it is also undesirable because it prevents the pipes from being laid close together endwise in the trench, since space must be left to remove the sling. Furthermore, when concrete or other relatively fragile pipe such as terra-cotta is supported in this manner, there is a tendency for the pipe to chip or crack, and unless the pipe is properly repaired, this damage may cause leaks. Moreover, this method of handling pipe is relatively slow and is therefore uneconomical.

With the foregoing in mind, it is a primary object of the present invention to provide a novel pipe-lifting apparatus which may be attached to a backhoe at a work location to permit the backhoe to handle pipes.

It is another object of the present invention to provide a unique pipe-lifting attachment for an existing boom to permit lengths of pipe to be laid closely in endwise fashion in a trench and without the assistance of an additional workman.

It is further an object of the present invention to provide an improved apparatus for lifting pipe which reduces the danger of damaging the pipe when fragile pipe is handled.

More particularly, the present invention provides a pipe-lifting apparatus for attachment to an existing boom on a backhoe for operation by a hydraulic cylinder mounted on the boom. The attachment comprises an extension member longitudinally aligned with the boom and a lifting yoke pivotally mounted on the extension

2 member and depending downwardly therefrom. The lifting yoke has a pair of arcuate legs in which a pair of claw members are telescopically mounted. The claw members are selectively extended and retracted to engage a pipe by means which is connected to the hydraulic cylinder and which is operated in response to the longitudinal movement of the cylinder operating rod.

In addition to these objects, other objects, features and advantages will become apparent from the following description when taken in conjunction with the accompanying drawings in which:

FIG. 1 is a side elevational view of a conventional backhoe;

FIG. 2 is an enlarged fragmentary side elevational view of the backhoe of FIG. 1 having a pipe-lifting attachment embodying the present invention;

FIG. 3 is a view taken along line 3—3 of FIG. 2 to illustrate means for adjusting the pipe-lifting apparatus to accommodate different pipe sizes;

FIG. 4 is a view taken along line 4—4 of FIG. 2 to illustrate the mechanism for extending and retracting the claw members in response to the movement of the hydraulic operating rod;

FIG. 5 is an enlarged view of the pipe-lifting apparatus, and is partially broken away and sectioned to illustrate construction details of the lifting yoke and claws;

FIG. 6 is an enlarged fragmentary view of the boom extension member illustrated in FIG. 2, partially in section to illustrate the mechanism for operating the claw members;

FIG. 7 is a transverse sectional view of the swivel connection of FIG. 5, and is partially broken away to illustrate means for limiting the angular displacement of the lifting yoke;

FIG. 8 is a transverse sectional view taken along line 8—8 of FIG. 5 to illustrate the telescopic mounting arrangement of the claw members within the yoke and;

FIG. 9 is a fragmentary perspective view of a claw member employed in the present invention.

Referring now to the drawings, FIG. 1 illustrates a conventional tractor 10 on which is mounted a front loading device 11 and a conventional excavating assembly, shown generally at 12, and commonly referred to as a backhoe. The backhoe 12 has a crane member 13 mounted on the tractor 10 to pivot about vertical and horizontal axes, and a boom member 14 mounted to pivot on a horizontal axis on the end of the crane member 13. The boom member 14 mounts a conventional hydraulic cylinder 15 having an operating rod 16 which extends along the boom and which is connected to linkage elements 17, 17 for actuating a bucket 18 mounted on the end of the boom 14. The movements of the crane and boom members on their respective axes are controlled by hydraulic cylinders actuated by operating levers on the tractor, the levers being manipulated by an operator.

In accordance with the primary object of the present invention, a pipe-lifting apparatus is provided for attachment to an existing boom on a backhoe to increase the versatility of the backhoe by permitting it to handle pipes. To this end, a pipe-lifting apparatus, shown generally at 20 (FIG. 2), is mounted on the free end of the boom 14, in the present instance after the bucket 18 shown in FIG. 1 has been removed. The pipe-lifting apparatus 20 has an extension member 22 which forms a longitudinal extension on the boom 14 and a lifting yoke 21 which depends downwardly from the extension member 22. The extension member is removably connected to the free end of the boom 14 by a pinned connection, in the present instance two pins 23 and 24, the pin 24 bearing against the bottom of the boom 14 to prevent the extension member 22 from pivoting on the pin 23. As may be seen in FIG. 2, the boom extension member 22 not only increases the working length of the boom 14, but it also houses an operating mechanism for the lifting yoke 21 to thereby provide a compact and unitary attachment which is particularly adapted for rapid field installation. Moreover, because of the pinned connection, only a minimum amount of tools are required to effect the attachment.

In accordance with the present invention, apparatus is provided for lifting pipes in a manner which reduces the danger of cracking or chipping the pipe, and this is effected in the present invention by a lifting apparatus which supports a pipe along its lower peripheral surface. To this end, the lifting yoke 21 is provided with a pair of claw members 25, 25 (FIGS. 2, 5, 9) which are telescopically mounted to be selectively extended as shown in broken lines in FIG. 5 or retracted as shown in full lines therein. In this manner, an operator may position the lifting yoke 21 over a pipe at a storage location, for example, a pipe 26 in FIG. 2, and lift the pipe 26 by extending the claw members 25, 25 as shown, to thereby engage the lower peripheral surface of the pipe 26 for transporting the pipe from its storage location to a work location, for example, the trench 27.

For the purpose of telescopically mounting each claw member 25, the lifting yoke 21 is provided with a pair of arcuately shaped legs 28, 28 which extend outwardly from a neck 21a on the yoke, and each leg has a channel 29 extending lengthwise therein. Each claw member 25 has an enlarged rib 30 (FIG. 8) which is slidable within each channel 29, and each claw member is retained within its channel by inturned flanges 31, 31. The travel of each claw member in its channel is limited, for example, by a slot 37 provided on the righthand leg 28 which cooperates with a pin 38 on the rib 30 to provide limit positions for each claw member. Thus, the claw members may be selectively extended and retracted between their limit positions to operatively engage the lower peripheral surface of a pipe to lift the pipe with a minimum amount of damage to the pipe.

In order to improve the durability of the apparatus of the present invention, a curved wear plate 32, 32 is removably secured to each rib 30, for example, by means of bolts 33, 34, and a wear tooth 35 is secured to the outer end of each rib 30, for example, by a bolt 36 which permits the tooth to be removed and replaced after it has become worn. In addition, a housing 39 is provided to cover the legs of the yoke to prevent foreign matter from damaging the apparatus.

As noted heretofore, the lifting yoke depends downwardly from the boom extension member, and for the purpose of securing the yoke to the extension member, a tubular column shown generally at 40 is provided. The column 40 has an upper portion 41 mounting a bracket 42 which is pivotally secured to the end of the extension member 22 by a pin 43, and the column 40 has a lower portion 44 connected to the neck 21a of the lifting yoke. In order to permit the yoke to be aligned with a pipe prior to lifting, the upper portion 41 and the lower portion 44 of the column 40 are connected together by means which provides a swivel connection therebetween (FIGS. 5, 7). The swivel connection comprises a flange 41'a on the upper portion 41 of the column and a flange 44a on the lower portion 44 thereof. A coupling 45 (FIG. 7) rotatably receives each portion of the column and joins the flanges to form an assembly in which the lifting yoke 21 may be pivoted on its vertical axis to facilitate its alignment with a pipe prior to lifting the pipe and which permits the pipe to be positioned before it is laid. The angular displacement of the yoke 21 on its axis is limited, however, by stop means provided on the coupling 45. The stop means comprises a pin 47 on the flange 44a and a stop 48 provided in a groove on the other flange 41a to engage the pin 47 upon a predetermined amount of angular displacement of the yoke.

In accordance with the present invention, the extension and retraction of the claw members is controlled by a conventional hydraulic cylinder which is mounted on an existing boom of a backhoe, and for this purpose, means is provided to extend the claw members when the operating rod of the hydraulic cylinder is displaced in a first direction and to retract the claw members when the operation rod is displaced in a second direction. To this end, the claw operating means comprises a pair of cables 50, 50 each having its ends secured in longitudinal grooves 51, 51 in the periphery of the ribs 30, 30 (FIG. 8). Each cable 50 has portion 50' which extends downwardly along its channel 51, outwardly through an opening in each leg 28, around pulleys 52, 52 and 52b into a recess 21b in the neck of the yoke, and around a pulley 53. Another portion 50'' of each cable 50 is also secured in each groove 51 and extends in an opposite direction upwardly into the neck 21a and around a pulley 54, whereupon both portions of each cable extend upwardly through the column 40 to the operating mechanism on the boom extension member. Therefore, when tension is applied to one portion 50'' of each cable, the claw members are retracted into the legs, and when tension is applied to the other portion 50' of each cable, the claw members are extended outwardly from the legs. In this manner, displacement of each cable in alternate directions selectively extends and retracts the claw members.

For the purpose of applying tension to each cable to effect an extension and retraction of the claw members, means is provided which is operable in response to the displacement of the operating rod of the hydraulic cylinder. To this end, a double sheave 55 (FIGS. 4, 6) is mounted for rotation between the side panels 56 and 57 of the boom extension member 22. Each cable is wrapped around the sheave 55 so that when the sheave 55 is rotated in one direction, tension is applied to one portion of each cable, and when the sheave 55 is rotated in the opposite direction, tension is applied to the other portion of each cable to thereby alternately extend and retract the claw members.

For the purpose of rotating the sheave in opposite directions to operate the claw members, drive means is provided. The drive means comprises a pinion 60 centrally secured on the sheave 55 and a rack 61 engaging the pinion 60 mounted for sliding movement longitudinally in the extension member 22 in bearing blocks 62 and 63. One end of the rack 61 is pivotally connected to the backhoe linkage 17 by a pin 64, the pin 64 being restrained in a slot 65 provided in each end panel, for example in the panel 57 shown in FIG. 6. The operating rod 16 of the hydraulic cylinder 15 is connected to the linkage 17, so that when the operating rod 16 moves leftward as seen in broken lines in FIG. 2, the linkage 17 displaces the rack 61 and rotates the pinion 60 and sheave 55 to apply tension to each cable 50 in a direction to retract the claw members. When the operating rod 16 moves in the opposite direction or rightward as shown in full lines in FIG. 2, the rack 61 rotates the pinion 60 and sheave 55 in an opposite direction to thereby extend the claw members. If desired, an operator may actuate the cylinder 15 to move the operating rod 16 further leftward, whereupon the boom extension member may pivot upwardly to increase the lifting height of the boom. Thus, the extension and retraction of the claw members is controlled by the movement of the operating rod on the hydraulic cylinder, the hydraulic cylinder being actuated by conventional controls on the tractor.

In order to permit the lifting apparatus of the present invention to accommodate pipes of various sizes, means is provided to adjust the apparatus. To this end, the adjusting means comprises a curved plate 66 (FIG. 3) extending outwardly from each side of the yoke adjacent the neck. A pair of rods 67, 67 extend upwardly from the plate 66 along the sides of the yoke, and the rods are slidably mounted within guides 68, 68 on the yoke. A friction lock 69 is provided on each guide 68 to lock the rods in preselected positions to permit the apparatus to accommodate various pipe sizes by permitting the distance between the plate and the claw members to be varied.

In operation, the bucket 18 is removed from the boom 14 on the backhoe 12; the boom extension member 22 is secured to the boom 14, and the hydraulic cylinder linkage 17 is connected to the rack 61. The lifting apparatus is adjusted to accommodate a particular pipe size by operating the friction locks 69, 69 and moving the curved plate 66 into a position corresponding to the diameter of a pipe to be lifted. The lifting yoke 21 is then aligned with a pipe 26, and the control for the hydraulic cylinder 15 is actuated to extend the claw members around the lower portion of the pipe. The pipe 26 may thereby be lifted by the boom 14 as may be seen in full lines in FIG. 2, and the pipe may then be deposited in the trench 27 by again actuating the cylinder 51 to disengage the claw members from the pipe. If desired, the yoke may be manually pivoted on its axis while supporting the pipe to permit the pipe to be laid in any position.

In light of the foregoing, it may be seen that a pipe-lifting apparatus has now been provided for attachment of the boom of an existing backhoe to permit the backhoe to handle pipe in an efficient and economical manner. Furthermore, the present invention provides an attachment which may be rapidly mounted on a backhoe in the field with a minimum amount of tools to thereby increase the versatility of the backhoe.

While a preferred embodiment of the present invention has been described in detail, various modifications, alterations or changes may be made without departing from the spirit and scope of the present invention.

I claim:

1. A pipe-lifting apparatus for attachment to an existing boom having an operating rod movable in alternate directions longitudinally therealong, the apparatus comprising:
   an extension member attachable at one end to the boom to form a longitudinal extension,
   a yoke pivotally mounted on the other end of said extension member and depending downwardly therefrom in a substantially vertical plane,
   a pair of claw members telescopically mounted on said yoke, said claw members being selectively extendable to engage the lower portion of a pipe and support the pipe for transportation from a storage location to a work location, and said claw members being selectively rectractable to disengage said lower portion for releasing the pipe at the work location, and
   means operable in response to longitudinal movement of the operating rod in a first direction to selectively extend said claw members and operable in response to longitudinal movement of the operating rod in a second direction to retract said claw members.

2. A pipe-lifting apparatus according to claim 1 wherein said apparatus includes means providing a swivel connection intermediate said yoke and said boom extension member, whereby said yoke may swivel about its vertical axis to facilitate alignment thereof with a pipe to be transported.

3. A pipe-lifting apparatus according to claim 1 wherein said means to selectively extend and retract said claw members comprises a tubular column connecting said yoke to said boom extension member, two pairs of cables within said column, each pair is connected to a respective one of said claw members, a sheave mounted for rotation on said boom extension member and engaging each cable to displace each cable for extending and retracting said claw members upon rotation of said sheave in opposite directions, and means for selectively rotating said sheave in opposite directions, whereby upon selective displacement of each cable in opposite directions the claw members are selectively extended and retracted.

4. A pipe-lifting apparatus according to claim 3 wherein said yoke has a recessed neck opening into the interior of said column and a pair of arcuate legs extending outwardly from said neck, each of said legs having a channel slidably receiving one of said claw members and a pulley mounted adjacent the terminus of each leg; and each cable is connected to its respective claw member having one portion extending downwardly in said channel and around said pulley into said column through said neck and another portion extending upwardly in said channel and into said column through said neck, whereby tension selectively applied to said one portion of each cable extends each claw member and tension applied to said other portion of each cable retracts each claw member.

5. A pipe-lifting apparatus according to claim 3 wherein said means for selectively rotating said sheave in opposite directions comprises a pinion gear provided on said sheave, a rack engaging said pinion and mounted for displacement longitudinally on said boom extension member to rotate said pinion in opposite directions upon displacement of said rack in alternate directions, and means connecting said rack to the operating rod on the boom, whereby longitudinal displacement of the operating rod in selected alternate directions displaces the rack and rotates the pinion to selectively extend and retract the claw members.

6. A pipe-lifting apparatus according to claim 3 wherein said column has a swivel connection intermediate its ends to permit said yoke to pivot on its vertical axis, and said swivel connection has means to limit the angular displacement of said yoke on its axis, so that the cables within the column are prevented from being intertwined when the yoke is pivoted on its axis.

7. A pipe-lifting apparatus according to claim 1 wherein said apparatus has adjustable support means mounted on the yoke to engage the upper portion of a pipe, said adjustable support means comprising a curvilinear plate provided adjacent the inner periphery of said yoke, a rod connected to said plate and extending upwardly therefrom, a guide slidably mounting said rod in said yoke, and means including a friction lock to releasably secure said rod in preselected positions on said yoke, whereby the pipe-lifting apparatus may be adjusted to accommodate pipes having various diameters.

8. An attachment for lifting cylindrical bodies with an existing boom having an operating rod movable in alternate directions longitudinally along the boom, said attachment comprising:
   an extension member attachable to the free end of the boom,
   means releasably mounting said extension member on said free end of the boom,
   a yoke pivotally mounted on said extension member and depending downwardly therefrom, said yoke having an arcuate surface adapted to overlie and surround a portion of the circumference of a cylindrical body,
   at least one claw member telescopically carried by said yoke, said claw member being extendable to cooperate with said yoke to surround at least one half of said circumference, and
   means carried by said extension member and operable in response to movement of the operating rod in a first direction to extend said claw member for cooperating with said yoke to surround a cylindrical body for supporting the lower portion thereof, and operable upon movement of the operating rod in a second direction to retract said claw member to release said body, whereby the body may be transported from one location to another.

9. Apparatus according to claim 8 wherein said releasable mounting means comprises a bearing element on said extension member underlying the boom inwardly of the free end thereof and a pin engaging said boom and said boom extension member at the free end of the boom, whereby the bearing element engages the boom to prevent the extension member from pivoting downwardly around the pin when the frame is supporting a cylindrical body.

References Cited

UNITED STATES PATENTS

| 1,729,330 | 9/1929 | Dart | 294—86 |
| 2,298,145 | 10/1942 | Merrylees | 294—86 |

GERALD M. FORLENZA, Primary Examiner

G. F. ABRAHAM, Assistant Examiner

U.S. Cl. X.R.

214—658; 294—86